United States Patent  [11] 3,630,664

[72] Inventors: Joachim Nentwig; Karl Fuhr; Hans Rudolph, all of Krefeld-Bockum; Johannes Romatowski, Dormagen, all of Germany
[21] Appl. No. 644,081
[22] Filed June 7, 1967
[45] Patented Dec. 28, 1971
[73] Assignee Farbenfabriken Bayer Aktiengesellschaft Leverkusen, Germany

[54] PROCESS FOR DYEING SHAPED ARTICLES OF AROMATIC POLYCARBONATES
7 Claims, No Drawings

[52] U.S. Cl. ..................................................8/173, 8/92, 8/179, 8/130.1
[51] Int. Cl. .................................................. D06p 3/52
[50] Field of Search............................................ 8/55, 55 E, 179, 173, 93, 92, 130.1; 117/138; 260/37

[56] References Cited
UNITED STATES PATENTS

| | | | |
|---|---|---|---|
| 3,514,246 | 5/1970 | Bianco | 8/4 |
| 3,117,102 | 1/1964 | Crowe | 260/31.2 |
| 3,152,098 | 10/1964 | Snedeker | 260/37 |
| 3,148,172 | 9/1964 | Fox | 260/47 |
| 3,309,222 | 3/1967 | Caldwell | 117/138.8 |

*Primary Examiner*—Donald Levy
*Assistant Examiner*—B. Bettis
*Attorney*—Connolly and Hutz ABSTRACT: Obtaining deep shades and substantially accelerating dyestuff absorption in the dyeing of aromatic polycarbonates with dispersion dyestuffs or developing dyestuffs by carrying out the dyeing process in the presence of an aliphatic, aromatic or mixed aliphatic aromatic carbonate.

PROCESS FOR DYEING SHAPED ARTICLES OF AROMATIC POLYCARBONATES

The present invention relates to a process for dyeing shaped articles of aromatic polycarbonates with disperse dyestuffs or developing dyestuffs. The process consists in carrying out the dyeing in the presence of carbonates of the formula

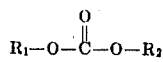

in which $R_1$ represents an alkyl, alkoxyalkyl or aroxyalkyl radical or an aralkyl or cycloalkyl radical which may be substituted in the ring system by alkyl, and $R_2$ means an aryl, aralkyl, aroxyalkyl or cycloalkyl radical which may be substituted in the ring system by alkyl and/or halogen.

The carbonates of the above formula include, for example: ethyl-phenyl-carbonate, butyl-phenyl-carbonate, isoamyl-phenyl-carbonate, nonyl-phenyl-carbonate, ethoxyethyl-phenyl-carbonate, propoxyethyl-phenyl-carbonate, phenoxyethyl-phenyl-carbonate, benzyl-phenyl-carbonate, cyclohexyl-benzyl-carbonate, methylcyclohexyl-phenyl-carbonate, methoxyethyl-naphthyl-carbonate, ethyl-o-cresyl-carbonate, ethyl-o-chlorophenyl-carbonate, ethyl-p-chloro-m-cresyl-carbonate, ethyl-benzyl-carbonate, butyl-benzyl-carbonate, ethyl-o-methylbenzyl-carbonate, ethyl-p-methylbenzyl-carbonate, ethyl-o-chlorobenzyl-carbonate, ethyl-p-chlorobenzyl-carbonate, ethyl-phenoxyethyl-carbonate, ethyl-cyclohexyl-carbonate, butyl-cyclohexyl-carbonate, ethyl-o-methylcyclohexyl-carbonate, ethyl-o-chlorocyclohexyl-carbonate, di-benzyl-carbonate, di-ethylbenzyl-carbonate, di-cyclohexyl-carbonate and di-methylcyclohexyl-carbonate.

The process according to the present invention enables shaped articles, e.g. filaments, fibers fabrics and foils, obtained from aromatic polycarbonates, to be dyed with disperse dyestuffs or developing dyestuffs yielding deep shades and substantially accelerating the dyestuff absorption.

The necessary amounts of the carbonates to be used according to the invention can readily be determined in each case by preliminary experiments; in general, amounts of 0.2 g. to 3 g. per liter dye liquor is sufficient depending upon the desired depth of the dyeing and upon the goods-to-liquor ratio. Since the carbonates of the above formula are water-insoluble, care must be taken that they are present in the dyebath in emulsified form. For this purpose, they may be added in the form of solutions in organic solvents, e.g. in isopropyl alcohol, to the dyebaths which contain an emulsifier or a mixture of emulsifiers; anionic and/or nonionic compounds may primarily be used as emulsifiers. Alternatively, it is also possible to add to the dyebaths mixtures which are prepared from the carbonates and emulsifiers.

By the term aromatic polycarbonates there are to be understood in the present case especially those polycarbonates which are based on dihydric phenols; examples of dihydric phenols are the following: hydroquinone, resorcinol, dihydroxy-diphenyl and, in particular, bisphenols, such as bis-(hydroxyphenyl)-alkanes, e.g. 2,2-bis-(4-hydroxyphenyl)-propane (bisphenol A), furthermore bis-(hydroxyphenyl)-cyclo-alkanes, ethers, sulfides sulfoxides or sulfones and mixtures of such dihydric phenols.

Suitable dispersion dyestuffs and developing dyestuffs are described, for example, in Diserens: "Die neuesten Fortschritte in der Anwendung der Farbstoffe," 2nd volume, 2nd edition (1949), pages 254 et seq., or 1st volume, 2nd edition (1946), pages 304 et seq.

The following examples serve to illustrate the invention without, however, limiting its scope; the parts given are parts by weight.

EXAMPLE 1

Fibers of bisphenol A—polycarbonate ($\eta$rel=1.75 to 2.15 in methylene chloride, c=0.5 g./100 ml. at 25° C.) are introduced into an aqueous bath having a goods-to-liquor ratio 1:40 and containing, per liter, 0.75 g. of the disperse dyestuff 1-hydroxy-4-(p-tolylamino)-anthraquinone and 2 g sodium oleyl methyl-tauride. Then there are added to the bath, per liter, while stirring, 2.5 g nonyl-phenyl-carbonate, dissolved in isopropyl alcohol. The fibers are subsequently dyed at 96°–98° C. for 2 hours, then rinsed and dried. A deep blue dyeing of very good fastness to light is obtained.

When the procedure is followed as indicated above, but with the difference that, instead of 2.5 g. nonyl-phenyl-carbonate, 5 g. of a mixture are added which is prepared from 50 parts ethyl-phenoxyethyl-carbonate, 35 parts water, 9 parts of the monoethyl ammonium salt of tetrapropylene-benzene-sulfonic acid and 6 parts of the reaction product of 16 mol ethylene oxide with 1 mol o-benzylphenylphenol, or from 25 parts butyl-phenyl-carbonate, 25 parts ethyl-benzyl-carbonate, 35 parts water, 9 parts of the monoethyl ammonium salt of tetra-propylene-benzene-sulfonic acid and 6 parts of the reaction product of 16 mol ethylene oxide with 1 mol o-benzylphenylphenol a deep blue dyeing of very good light fastness is also obtained.

EXAMPLE 2

Polycarbonate fibers of the type described in Example 1 are introduced into an aqueous bath having a goods-to-liquor ratio 1:40 and containing, per liter, 0.75 g. of the disperse dyestuff 1-amino-4-hydroxy-2-bromo-anthraquinone and 3 g. sodium dinaphthylmethane-disulfonate. There are then added to the bath while stirring, per liter, 2.5 g ethyl-benzyl-carbonate previously dissolved in isopropyl alcohol. The fibers are subsequently dyed at 96°–98° C. for 2 hours, then rinsed and dried. A deep red dyeing of very good light fastness is obtained.

We claim:

1. In the process of dyeing shaped articles of aromatic polycarbonates with disperse dyestuffs or developing dyestuffs, the improvement which consists in contacting the articles in a dyeing step with a dyeing liquor containing an active amount of a carbonate of the formula

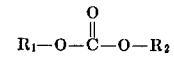

in which
$R_1$ is defined as alkyl, alkoxyalkyl, aroxyalkyl, aralkyl, cycloalkyl, alkyl substituted aralkyl and alkyl substituted cycloalkyl, the alkyl substituents being substituted on the ring system; and
$R_2$ is defined as aryl, aralkyl, aroxyalkyl, cycloalkyl, or the corresponding ring substituted compounds having as ring substituents members selected from the group consisting of alkyl and halogen; and thereafter rinsing and drying the articles.

2. The process of claim 1 wherein the dyeing step is effected at about 96°–98° C. in an aqueous dye bath.

3. The process of claim 1 wherein $R_1$ is ethyl or nonyl and $R_2$ is phenyl.

4. The process of claim 1 wherein $R_1$ is lower alkoxy-ethyl, phenoxy ethyl, benzyl, cyclohexyl or methyl cyclohexyl; and $R_2$ is benzyl, methyl benzyl, chlorobenzyl, phenyl, naphthyl, cresyl, cyclohexyl, methyl cyclohexyl, or chlorocyclohexyl.

5. The process of claim 1 wherein about 0.2 g–3 g. of the carbonate are utilized per liter of dyeing liquor.

6. The process of claim 1 wherein the articles are filaments, fibers, fabrics or foils of an aromatic polycarbonate.

7. A dyeing composition comprising a dispersion or developing dyestuff, an emulsifier, water and an active amount of a carbonate of the formula

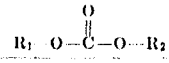

in which $R_1$ is defined as alkyl, alkoxyalkyl, aroxyalkyl, aralkyl, cycloalkyl, alkyl substituted aralkyl and alkyl substituted cycloalkyl, the alkyl substituents being substituted on the ring system; and $R_2$ is defined as aryl, aralkyl, aroxyalkyl, cycloalkyl, or the corresponding ring substituted compounds having as ring substituents members selected from the group consisting of alkyl and halogen.

* * * * *